United States Patent
Katoh et al.

(10) Patent No.: US 8,547,718 B2
(45) Date of Patent: Oct. 1, 2013

(54) POWER CONVERTER APPARATUS

(75) Inventors: Shuji Katoh, Hitachiota (JP); Shigenori Inoue, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 19 days.

(21) Appl. No.: 12/839,581

(22) Filed: Jul. 20, 2010

(65) Prior Publication Data
US 2011/0019449 A1 Jan. 27, 2011

(30) Foreign Application Priority Data
Jul. 21, 2009 (JP) .................. 2009-169686

(51) Int. Cl.
*H02M 7/537* (2006.01)
(52) U.S. Cl.
USPC ............................ 363/131; 363/71
(58) Field of Classification Search
USPC ............ 363/34, 37, 65, 67, 68, 71, 124, 131, 363/132
See application file for complete search history.

(56) References Cited

U.S. PATENT DOCUMENTS

RE37,126 E * 4/2001 Peng et al. .................. 363/137
7,638,983 B2 * 12/2009 Park et al. .................... 322/20
2003/0048651 A1 * 3/2003 Trimble et al. ............... 363/125
2003/0202367 A1 * 10/2003 Schreiber ..................... 363/72
2007/0279957 A1 * 12/2007 Oohashi et al. ............... 363/132

FOREIGN PATENT DOCUMENTS

| CN | 101378227 A | 3/2009 |
| JP | 10-066388 | 3/1998 |
| JP | 10-161755 | 6/1998 |
| JP | 11-041931 | 2/1999 |
| WO | WO 2008/125494 | 10/2008 |

OTHER PUBLICATIONS

Makoto Hagiwara et al., PWM Control and Experiment of Modular Multilevel Converters, IEEJ Trans. IA, 2008, pp. 957-965, vol. 128, No. 7.
Office Action in JP 2009-169686, mailed Nov. 22, 2011 (in Japanese, 2 pgs.).
Ding, Guanjun, et al: "New Technologies of Voltage Source Converter (VSC) for HVDC Transmission System Based on VSC", Power and Energy Society General Meeting—Conversion and Delivery of Electrical Energy in the 21$^{st}$ Century, IEEE Xplor Digital Library, IEEE Standards, IEEE Spectrum, ©2008 IEEE, pp. 1-8.
Office Action in Chinese Patent Appln. 201010229996.5, mailed Oct. 10, 2012 (7 pgs.).

* cited by examiner

*Primary Examiner* — Nguyen Tran
(74) *Attorney, Agent, or Firm* — Antonelli, Terry, Stout & Kraus, LLP.

(57) ABSTRACT

A power converter apparatus having a configuration of a plurality of unit cells, including a DC capacitor and semiconductor devices, connected in cascade, includes a variable voltage source that is connected with a DC link, and a unit having a function that initially charges up the DC capacitor in the unit cell alone selected at a time of an initial charge.

17 Claims, 4 Drawing Sheets

POWER CONVERTER APPARATUS

BACKGROUND OF THE INVENTION

The present invention relates to a power converter apparatus, and in particular to a power converter apparatus linked to an AC power system via a transformer.

A document written by Makoto Hagiwara and Hirofumi Akagi and entitled "PWM Control and Experiment of Modular Multilevel Converters (MMC)" Journal of The Institute of Electrical Engineers of Japan, vol. 128, No. 7, 2008, pp. 957-965, has proposed a modular multilevel converter (MMC) by using switching devices (Insulated-Gate Bipolar Transistor, IGBT etc.) to be able to control on and off, as a system of a power converter apparatus capable of outputting a high voltage exceeded over a withstand voltage of the switching device.

The MMC is a converter using a bidirectional chopper circuit or full bridge circuit, as a unit cell, connected to a DC capacitor, and input and output terminals of that are connected in cascade. The MMC has an aspect that the phase of PWM control carrier wave of the unit cell is shifted by every unit cell to thereby inhibit an output voltage harmonic wave. The MMC has been known that it can be used as a system-cooperative voltage converter, such as a reactive power output device, an active power storage device, etc.

When the modular multilevel converter is connected to a power system, an excessive current or an inrush current is flown into the DC capacitor via diodes configuring the bidirectional chopper circuit or full bridge circuit of the unit cell if the DC capacitor in every unit cell is not charged up. In this countermeasure, the above-mentioned document discloses an initial charge system which charges the DC capacitors from the AC power system via a resistor, as a system of charging up the DC capacitor safely.

SUMMARY OF THE INVENTION

In a voltage type converter connected with an AC voltage source such as a power system, an AC voltage output from a power converter varies greatly from the voltage of AC voltage source to thereby flow an excessive current into the voltage type power converter, when the voltage type converter is linked to the power system. Therefore, it is required not only to charge up the DC capacitor in the unit cell, but also to output a voltage substantially equal to the system voltage by the MMC, when the MMC as the voltage type power converter is connected with the AC voltage source.

The MMC outputs a composite voltage of the respective unit cells, therefore, it is required to verify a soundness of the unit cells or an output of a predetermined voltage from the unit cells before the MMC is connected with the power system.

In a phase where the soundness of unit cells is verified, it is desirable that a voltage is applied alone to the DC capacitor in the unit cell to be verified operationally for a purpose of safety, and the operation of unit cells is verified individually in sequence.

However, as described in the above document, the DC capacitors in all of the unit cells are initially charged up simultaneously when charging up initially via the resistor from the power system. Therefore, it is difficult to charge up the DC capacitor in an arbitrary cell alone.

An object of the invention is to provide a power converter apparatus in which unit cells such as bidirectional chopper circuits, full bridge circuits, etc. are connected in cascade to provide a function of initially charging up a specific cell alone.

In order to realize the above-mentioned object, the power converter apparatus having a configuration such that the unit cells are connected in cascade, provides a variable voltage source connected with a DC link, and a function of initially charging up a DC capacitor in the unit cell alone selected at a time of an initial charge.

The variable voltage source is a DC voltage source in the power converter apparatus.

Further, in order to realize the above-mentioned object, the power converter apparatus having a configuration such that the unit cells are connected in cascade, provides a variable voltage transformer between the apparatus and a three-phase power system, and a unit that turns on a semiconductor device in the unit cell except for the unit cell selected at a time of initially charging up a DC capacitor.

The power converter apparatus provides a configuration of a modular multilevel converter.

The unit cell in the power converter apparatus provides a bidirectional chopper circuit.

The unit cell in the power converter apparatus provides a full bridge circuit.

The power converter apparatus is connected with a three-phase power system.

The power converter apparatus includes a unit that turns on a lower cascade arm IGBT of the bidirectional chopper circuit of the unit cell except for the unit cell selected at the time of initially charging up the DC capacitor to turn on the lower cascade arm IGBT in the unit cell except for the unit cell selected, and bypass a charge current to the DC capacitor by the lower cascade arm IGBT, so that the charge-up to the DC capacitor in the unit cell, which is not selected, can be prevented.

The power converter apparatus sets a maximum value of the voltage in the variable voltage source to a rated voltage of the DC capacitor in the unit cell, while adjusting the voltage of the variable voltage source connected with the DC link, to perform the initial charge, so that an excessive voltage application and excessive charge to the DC capacitor can be prevented.

According to the power converter apparatus in the invention, an initial charge can be made on a specific unit cell alone. An operation test can be applied to a voltage-applied specific unit cell alone. A verification operation can be realized safely in advance, before linking to the three-phase power system.

The other objects, features and advantages of the invention will become apparent from the following description of the embodiments of the invention taken in conjunction with the accompanying drawings.

DESCRIPTION OF THE EMBODIMENTS

First Embodiment

A first embodiment of the invention will be described below.

In the first embodiment, a modular multilevel converter (MMC) will be described as an example in the invention.

Figure 1:
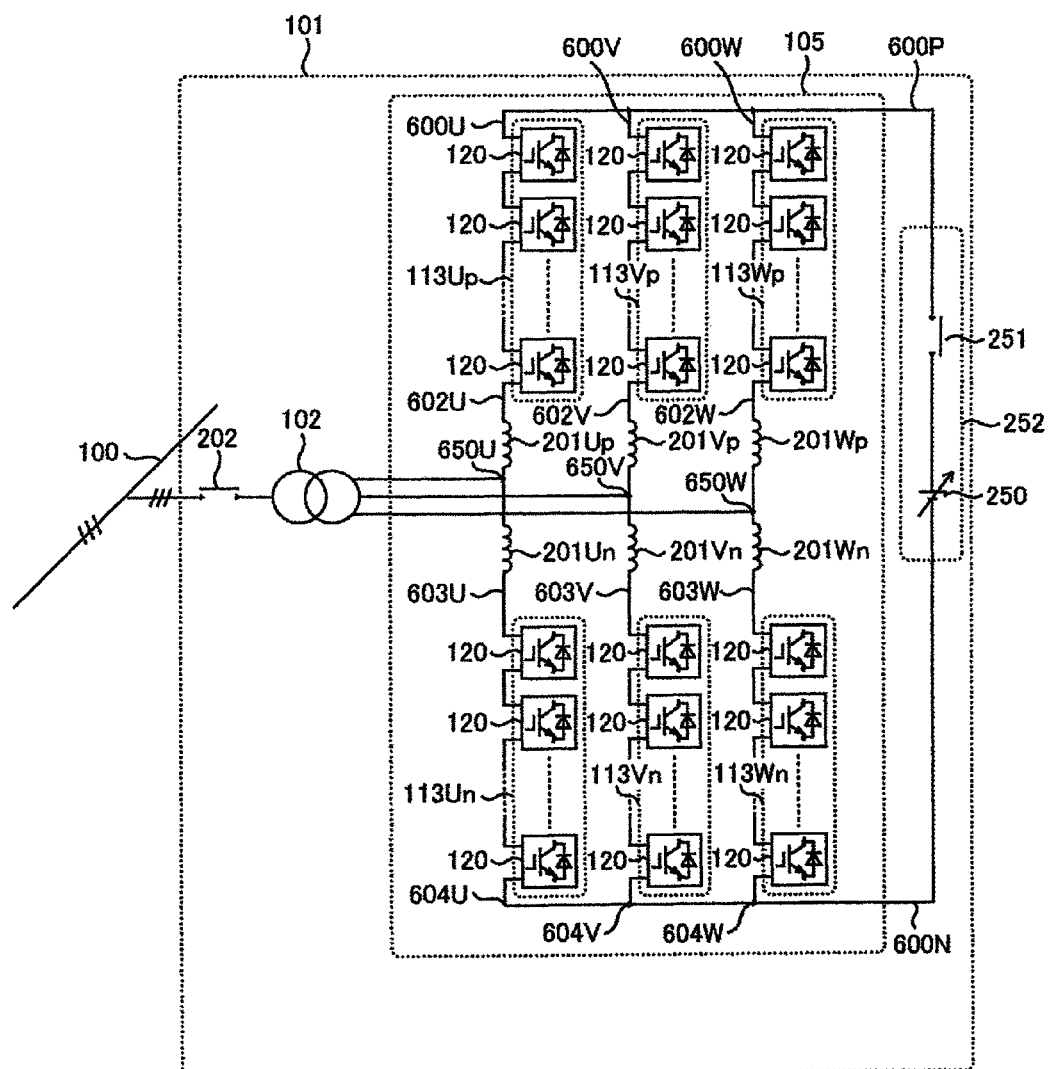
FIG. 1 is a circuit diagram showing a power converter apparatus in a first embodiment of the invention.

FIG. 1 is a circuit diagram in the first embodiment of the invention. A configuration of a power converter apparatus 101 in the invention will be described first with reference to FIG. 1.

The power converter apparatus 101 is configured by six pieces of cascade arms 113Up, 113Vp, 113Wp, 113Un, 113Vn, 113Wn, arm reactors 201Up, 201Vp, 201Wp, 201Un, 201Vn, 201Wn and a linked transformer 102, a breaker 202, and a cell initial charge-up circuit 252.

Figure 2:
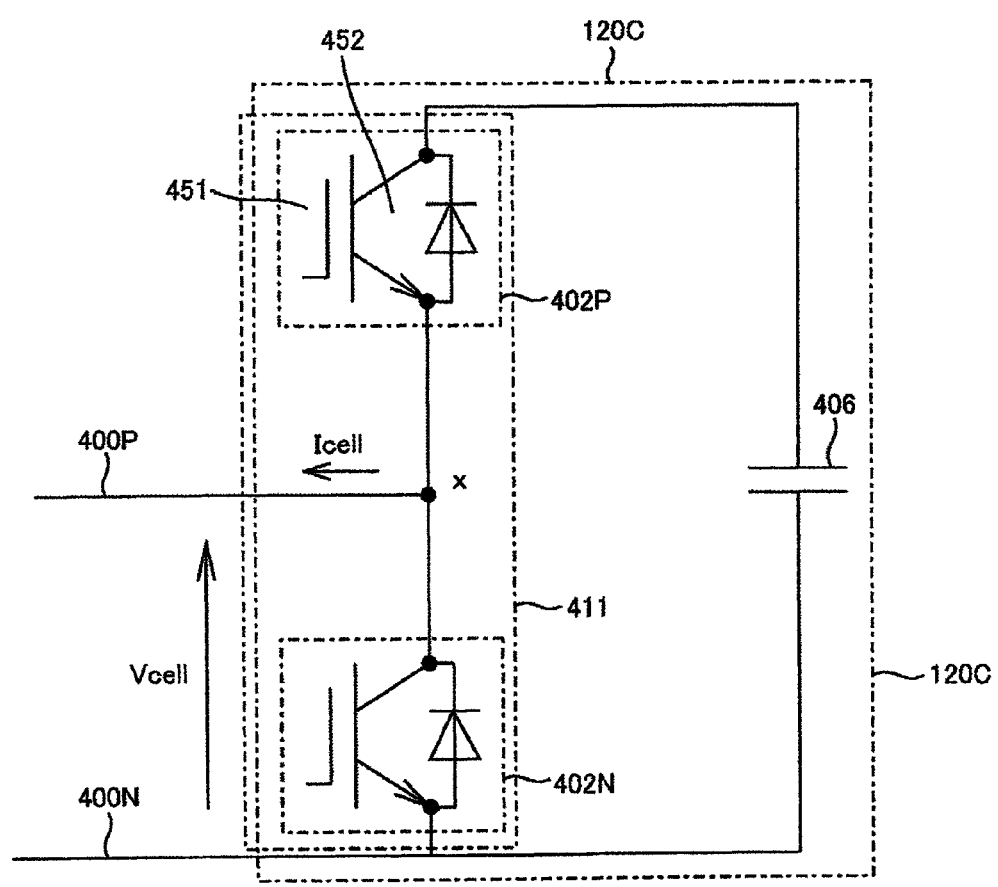
FIG. 2 is a circuit diagram showing a unit cell as a bidirectional chopper circuit in the first embodiment of the invention.

Unit cells 120 are configured by a bidirectional chopper circuit 120C shown in FIG. 2. The bidirectional chopper circuit 120C provides an IGBT leg 411 configured by an IGBT parallel module 402P and an IGBT parallel module 402N as semiconductor devices, and a DC capacitor 406 connected with the IGBT leg 411.

The IGBT parallel modules 402P, 402N are configured respectively by an IGBT 451 and a diode 452 connected in anti-parallel with the IGBT 451. The term "parallel module" means a module which includes an IGBT and a diode connected together in parallel. An anode and a cathode of the IGBT parallel module 402N operate respectively as an output terminal 400P and an output terminal 400N of the unit cell 120 or bidirectional chopper circuit 120C. Referring to FIG. 1 and FIG. 2, except for both end terminals (600U and 602U, 600V and 602V, 600W and 602W) of the cascade arms (113Up, 113Vp, 113Wp) and (603U and 604U, 603V and 604V, 603W and 604W) of the cascade arms (113Un, 113Vn, 113Wn), that is, except for the output terminals 400P, 400N of the cascade arms (113Up, 113Vp, 113Wp, 113Un, 113Vn, 113Wn), either the output terminal 400N of one unit cell 120 is connected to the output terminal 400P of the other unit cell 120 or the output terminal 400P of one unit cell 120 is connected to the output terminal 400N of the other unit cell 120.

Referring back to FIG. 1, the cascade arms 113Up, 113Un for a U-phase are connected respectively with the arm reactors 201Up, 201Un. Likewise, the cascade arms 113Vp, 113Vn for a V-phase and 113Wp, 113Wn for a W-phase are also connected respectively with the arm reactors 201Vp, 201Vn and 201Wp, 201Wn. The terminals (600U, 600V, 600W) of high-voltage side cascade arms 113Up, 113Vp, 113Wp are commonly connected with one another to then be connected with a high-voltage side terminal of initial charge-up circuit 252. The above-mentioned commonly connected point is referred to as a 600P. The terminals (604V, 604W) of low-voltage side cascade arms 113Un, 113Vn, 113Wn are commonly connected with one another to also be connected with a low-voltage side terminal of initial charge-up circuit 252. The above-mentioned commonly connected point is referred to as a 600N. In addition, the initial charge-up circuit 252 is configured by a variable voltage source 250 and a contactor 251.

An intermediate point 650U between the arm reactors 201Up and 201Un is connected with a three-phase power system 100 via the three-phase transformer 102 and contactor 202. Likewise, an intermediate point 650V between the arm reactors 201Vp and 201Vn and an intermediate point 650W between the arm reactors 201Wp and 201Wn are connected respectively therewith. Next, an operation of the power converter apparatus 101 in the invention will be described below.

First, a description will be concerned with the output voltage for each phase of a power converter 105 configuring the power converter apparatus 101. In this regard, a potential at the connected point 600N on the power converter apparatus 101 is set to a reference potential, unless otherwise specified. Further, the intermediate point or connected point 650U between the arm reactors 201Up and 201Un on the leg corresponds to an input/output terminal of the U-phase, likewise, the intermediate point or connected point 650V between the arm reactors 201Vp and 201Vn on the leg corresponds to an input/output terminal of the V-phase, and the intermediate point or connected point 650W between the arm reactors 201Wp and 201Wn on the leg corresponds to an input/output terminal of the W-phase. The potential at the input/output terminal is then called an output voltage for each of the phases in the power converter 105.

Further, the potentials at the input/output terminals 602U, 602V, 602W on the low-voltage side of the high-voltage side cascade arms 113Up, 113Vp, 113Wp are called inside cascade arm voltages V113Up, V113Vp, V113Wp, respectively. Likewise, the potentials at the input/output terminals 603U, 603V, 603W on the high-voltage side of the low-voltage side cascade arms 113Un, 113Vn, 113Wn are called inside cascade arm voltages V113Un, V113Vn, V113Wn, respectively.

The high-voltage side input/output terminals 600U, 600V, 600W of each of the high-voltage side cascade arms 113Up, 113Vp, 113Wp are connected commonly to the connected point 600P, and the low-voltage side terminals 604U, 604V, 604W of the low-voltage side cascade arms 113Un, 113Vn, 113Wn are connected commonly to the connected point 600N, however, the potential at the connected point 600P of the power converter 105 is called a PN voltage.

An ordinary operation of the power converter apparatus 101 will be described below.

An interchange power between the power converter apparatus 101 and the three-phase power system can be controlled by adjusting the amplitude and phase of the respective phase output voltages on the basis of the system voltage in the power converter apparatus 101.

The output voltage for each of the phases in the power converter 105 configuring the power converter apparatus 101 becomes substantially an average of the inside cascade arm voltages for each of the phases. For example, the output voltage becomes an average value of the inside cascade arm voltages V113Up and V113Un in the U-phase, an average value of the inside cascade arm voltages V113Vp and V113Vn in the V-phase, and an average value of the inside cascade arm voltages V113Wp and V113Wn in the W-phase. Therefore, the output voltage for each of the phases in the power converter 105 can be controlled by the inside cascade arm voltages.

In the meantime, the inside cascade arm voltage can be controlled as described below.

A voltage applied to between the input/output terminals (600U and 602U, 600V and 602V, 600W and 602W) of the cascade arms 113Up, 113Vp, 113Wp on a P-side in the power converter apparatus 101, is a composite voltage of the output voltages of the respective unit cells 120 configuring the cascade arms 113Up, 113Vp, 113Wp. Likewise, a voltage applied to between the input/output terminals (603U and 604U, 603V and 604V, 603W and 604W) of the cascade arms 113Un, 113Vn, 113Wn on an N-side in the power converter apparatus 101, is also a composite voltage of the output voltages of the respective unit cells 120 configuring the cascade arms 113Un, 113Vn, 113Wn. Therefore, the inside cascade arm voltages V113Un, V113Vn, V113Wn in the lower-side cascade arms 113Un, 113Vn, 113Wn can be controlled by the output voltage of the respective unit cells 120 in the lower-side cascade arms 113Un, 113Vn, 113Wn. In contrast, the inside cascade arm voltages V113Up, V113Vp, V113Wp on the P-side can also be controlled by the output voltage of the respective unit cells 120 configuring the P-side cascade arms 113Up, 113Vp, 113Wp on the basis of the voltage at the connected point 600P in the power converter apparatus 101.

Therefore, the output voltage of the respective unit cells 120 is controlled to thereby control a power interchange amount between the three-phase power system 100 and the power converter apparatus 101. The output voltage of unit cell 120 is adjusted that the IGBT leg 411 is controlled by PWM, therefore, it is required to charge the DC capacitor 406 in the respective unit cells 120 up to a predetermined voltage.

The following description will be concerned with an operation sequence before starting the power converter apparatus 101.

First, the IGBT 451 of the IGBT parallel module 402N in one unit cell 120 is turned off and the IGBT 451 of the IGBT parallel module 402N in the other unit cells 120 is all turned on.

Next, the contactor 251 in the initial charge-up circuit 252 is turned on. The output terminal of the unit cells 120, in which the IGBT 451 in the IGBT parallel module 402N is turned on, is shunted by the turned-on IGBT 451, therefore the DC capacitor 406 in the unit cell is not charged up, even though the voltage of variable voltage source 250 in the initial charge-up circuit 252 is raised gradually. In contrast, in the unit cell 120 in which the IGBT 451 of the IGBT parallel module 402N is turned off, the DC capacitor 406 is charged up through the diode 452 in the IGBT parallel module 402P to be able to raise the voltage of DC capacitor 406. This can raise the voltage of DC capacitor 406 up to the maximum voltage output from the variable voltage source 250. That is, the output voltage of variable voltage source 250 is adjusted to raise the voltage of DC capacitor 406 up to a predetermined voltage. In this way, the IGBT 451 of the IGBT parallel module 402N in the one specific unit cell 120 is alone turned off, and the IGBT 451 of the IGBT parallel module 402N in the other unit cells 120 is all turned on, therefore, the DC capacitor 406 in a single unit cell 120 alone can be charged up initially.

Next, verification is performed for the unit cell 120 in which the DC capacitor is charged up.

The IGBT parallel modules 402P, 402N, in which the DC capacitor 406 in the unit cell is charged up, are switched by the PWM control. It is confirmed that the input/output terminal of unit cell 120 outputs the predetermined voltage, and the soundness of unit cell 120 is then verified. The term "soundness of unit cell" means a normal operating state of unit cell. Thereafter, the voltage of variable voltage source 250 in the initial charge-up circuit 252 is lowered to then open the contactor 251 and turn off the IGBT 451 of the IGBT parallel module 402P in the unit cell 120 in which the DC capacitor 406 is charged up. In this way, the verification operation for one unit cell is completed by the above-mentioned sequence operation.

Next, the IGBT 451 of the IGBT parallel module 402N in one unit cell 120, which is different from the unit cell 120 in which the DC capacitor 406 is charged up, is alone turned off. Under this condition, the contactor 251 in the initial charge-up circuit 252 is turned on to raise gradually the voltage of variable voltage source 250, charge up the DC capacitor 406 in the unit cell 120, and perform the verification operation for the unit cell 120. The above-mentioned operation is repetitively performed to verify individually the operation of unit cells 120.

After verifying the operation for all of the unit cells 120, it is confirmed that the power converter apparatus 101 can output the voltage equivalent to the system voltage to then be linked to the three-phase power system 100. In this way, the soundness of unit cell 120 is verified to then connect with the three-phase power system 100, so that a manufacturing defective etc. can be found in advance and an accident at a time of linking to the three-phase power system 100 can be prevented.

Second Embodiment

The unit cell 120 in the power converter apparatus 101 of the first embodiment is configured by the bidirectional chopper circuit 120C. In contrast, a second embodiment has an aspect that the unit cell 120 is configured by a full bridge circuit 120F.

First, a configuration of the power converter apparatus 101 in the second embodiment will be described below. As described above, the second embodiment is only different from the first embodiment in the unit cell 120, therefore, the configuration of unit cell 120 will only be described below.

Figure 3:
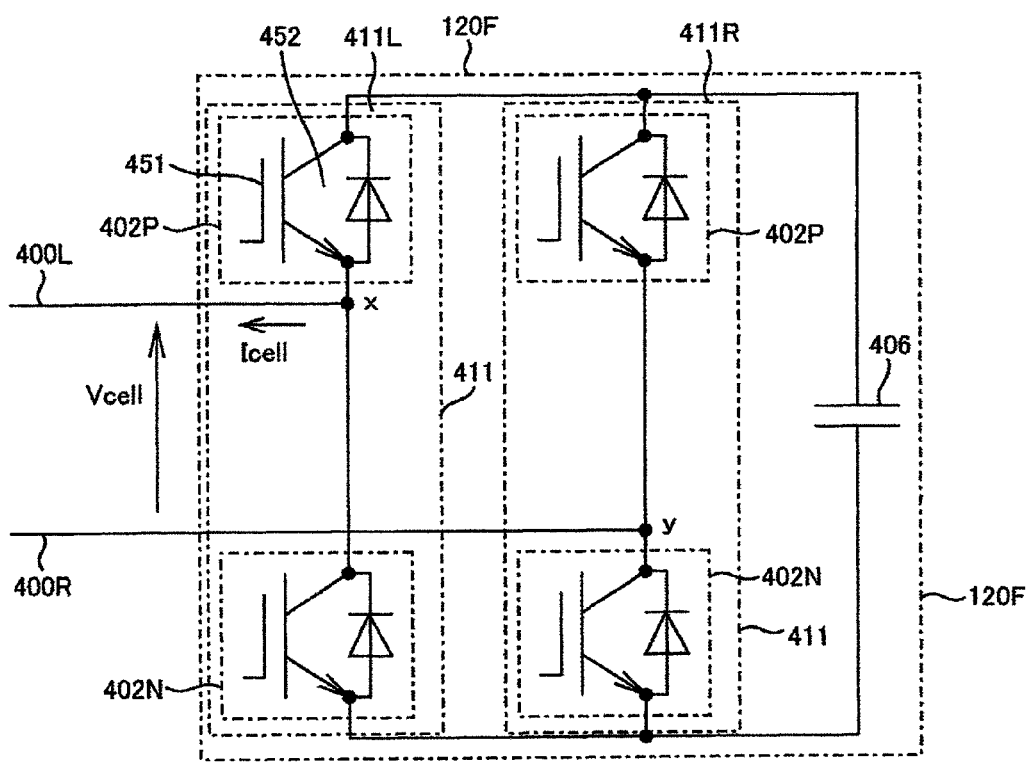
FIG. 3 is a circuit diagram showing the unit cell as a full bridge circuit in a second embodiment of the invention.

FIG. 3 shows a configuration of the full bridge circuit 120F configuring the unit cell 120 in the second embodiment. The full bridge circuit 120F or 120 has two-parallel IGBT legs 411L, 411R, both of which are connected in parallel with the DC capacitor 406. The IGBT legs 411L, 411R have respectively the IGBT parallel modules 402P, 402N, both of which are connected in series, similarly to the first embodiment. An input/output terminal 400L is provided at a connected point x between the IGBT parallel modules 402P and 402N in the IGBT leg 411L, and an input/output terminal 400R is provided at a connected point y between the IGBT parallel modules 402P and 402N in the IGBT leg 411R. The input/output terminals 400L, 400R of the respective unit cell 120 are connected in cascade.

The following description will be concerned with an operation of the power converter apparatus 101 in this embodiment. The second embodiment is basically equivalent to the first embodiment, except that positive and negative voltages are output respectively to the input/output terminals 400L, 400R of the full bridge circuit 120F configuring the unit cell in this embodiment. Therefore, an operation for the respective unit cells 120 will only be described when charging up the DC capacitor 406 in a specific unit cell 120 alone.

In the power converter apparatus 101 of the second embodiment, all of the IGBTs 451 configuring the unit cell 120 are blocked in gate for the unit cells 120 alone in which the DC capacitor 406 is intended to charge up.

In the other unit cells 120, either the two IGBT parallel modules 402P configuring the unit cell are turned on or the two IGBT parallel modules 402N configuring the unit cell are turned on to make the input/output terminals 400L, 400R in the unit cell 120F or 120 shunted.

The input/output terminals 400L, 400R in the unit cell 120 are shunted except for the unit cells 120 in which all of the IGBTs 451 are blocked in gate. Therefore, the contactor 251 in the initial charge-up circuit 252 is turned on to gradually raise the voltage of the variable voltage source 250 in the initial charge-up circuit 252, so that only the DC capacitor 406 in the unit cell 120, in which all of the IGBTs 451 are blocked in gate, can be charged up.

On a steady state, likewise to the first embodiment, the IGBT legs 411L, 411R in the full bridge circuit 120F configuring the unit cell 120 are controlled by a so-called PWM control. The IGBT legs 411L, 411R configuring the full bridge circuit 120F provide respectively a voltage command value of reversing in positive and negative to then perform the PWM. A pulse voltage corresponding to a voltage difference of the voltage command values is then output to the input/output terminals 400L, 400R of full bridge circuit 120F or between the input/output terminals 400L, 400R of the unit cell 120. The output voltage of the unit cell 120 is a voltage difference between the IGBT legs 411L, 411R. Therefore, it has a merit such that the positive and negative voltages can be output, in contrast to the first embodiment that only outputs a zero or positive voltage from the unit cell 120. Further, the second embodiment can realize to inhibit a harmonic voltage component output from the unit cell 120, rather than the first embodiment.

Third Embodiment

Figure 4:
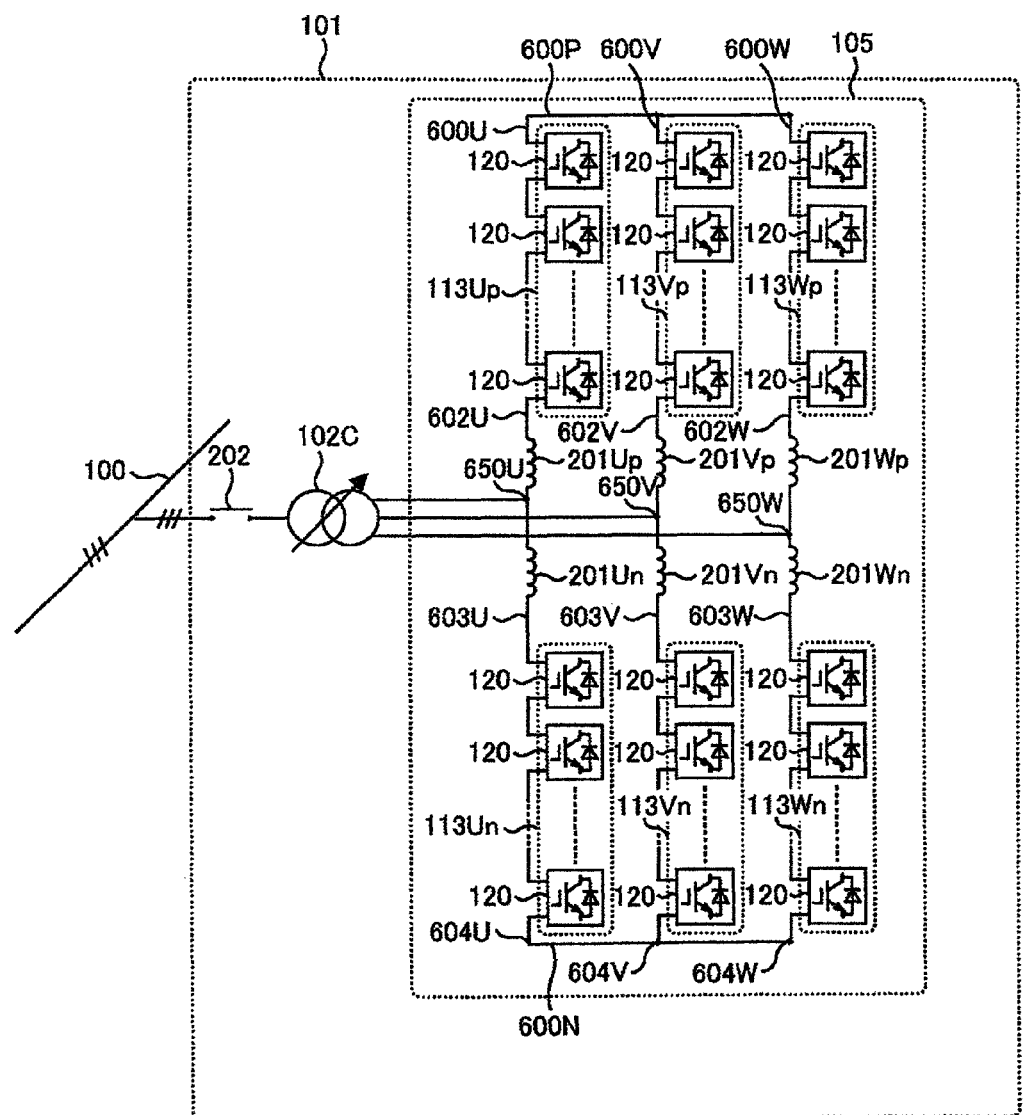
FIG. 4 is a circuit diagram showing another power converter apparatus in a third embodiment of the invention.

A third embodiment has an aspect to have a function that initially charges up the DC capacitor from the three-phase power system 100. FIG. 4 shows a configuration of the power converter apparatus 101 in the third embodiment. The power converter apparatus 101 in this embodiment has a variable voltage transformer 102C in place of the initial charge-up circuit 252 shown in FIG. 1 of the first embodiment. Other elements in FIG. 4 are the same as shown in FIG. 1, therefore, description for these will be omitted.

An operation of the unit cell 120 is basically the same as that of the first and second embodiments. However, when the DC capacitor 406 in an arbitrary unit cell 120 is charged up initially in the third embodiment, the contactor 202 is closed to initially charge up the DC capacitor 406 in the unit cell 120 while adjusting an output voltage of the variable voltage transformer 120C. In contrast, in the first and second embodiments, the contactor 251 is closed under a condition where the contactor 202 is open, and the DC capacitor 406 in an arbitrary unit cell 120 is charged up initially while adjusting the voltage of the variable voltage source 250.

In consequence, the DC capacitor 406 is charged up initially, while adjusting the output voltage of variable voltage transformer 120C, to be able to charge it up to a predetermined voltage value, without charging up excessively the DC capacitor 406 in an arbitrary unit cell 120.

This invention can be used for a reactive power compensation device (STATCOM), a back-to-back system (frequency conversion device etc.), a high-voltage DC power transmission system (HVDC), a motor drive, etc.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A power converter apparatus configured for an ordinary operation and an initial charging operation, which occurs prior to starting of the ordinary operation, comprising:
a plurality of unit cells, each of which includes terminals, a capacitor and semiconductor switching elements connected in series, the capacitor and the semiconductor switching elements being connected in parallel, and a voltage at the capacitor being output at the terminals by operation of the semiconductor switching elements;
a variable voltage source for outputting a variable electric power; and
wherein the terminals of adjacent ones of the unit cells are connected so that the plurality of unit cells are connected together in cascade and configure an arm of the power converter,
wherein at a time of the initial charging operation, a capacitor of a selected unit cell is charged to a certain voltage to be available for the succeeding ordinary operation,
wherein in the initial charging operation, the capacitor of at least a selected one of the unit cells of the arm is charged at the terminals of that unit cell to the certain voltage with the output of the variable voltage source applied to the arm via non-selected unit cells of the arm, and the capacitors of the non-selected unit cells are not charged due to shunting of the terminals of the non-selected unit cells by turning off or on of the semiconductor switching elements thereof,
wherein a time period of charging the capacitor of an individual unit cell in the initial charging operation is longer than a time period of turning on/off of the semiconductor switching elements of the unit cell in the ordinary operation, and
wherein in the ordinary operation of the power converter, the capacitor in each unit cell of the arm is charged from a predetermined portion of the arm via the adjacent unit cells, and an output of the power converter is a combined voltage of the output voltages of the unit cells of the arm.

2. The apparatus according to claim 1 wherein the variable voltage source comprises a variable DC voltage source.

3. A power converter apparatus configured for an ordinary operation and an initial charging operation which occurs prior to starting of the ordinary operation, comprising:
a plurality of unit cells, each of which includes terminals, a capacitor and semiconductor switching elements connected in series, the capacitor and the semiconductor switching elements being connected in parallel, and a voltage at the capacitor being output at the terminals by operation of the semiconductor switching elements;
a variable voltage transformer, disposed between the plurality of unit cells and an AC power system, for outputting a variable electric power; and
wherein the terminals of adjacent ones of the unit cells are connected so that the plurality of unit cells are connected together in cascade and configure an arm of the power converter,
wherein at a time of the initial charging operation, a capacitor of a selected unit cell is charged to a certain voltage to be available for the succeeding ordinary operation,
wherein in the initial charging operation, the capacitor of at least a selected one of the unit cells of the arm is charged at the terminals of that unit cell to the certain voltage with the output of the variable voltage source applied to the arm via non-selected unit cells of the arm, and the capacitors of the non-selected unit cells are not charged due to shunting of the terminals of the non-selected unit cells by turning off or on of the semiconductor switching elements thereof,
wherein a time period of charging the capacitor of an individual unit cell in the initial charging operation is longer than a time period of turning on/off of the semiconductor switching elements of the unit cell in the ordinary operation, and
wherein in the ordinary operation of the power converter, the capacitor in each unit cell of the arm is charged from a predetermined portion of the arm via the adjacent unit cells, and an output of the power converter is a combined voltage of the output voltages of the unit cells of the arm.

4. The apparatus according to claim 1 further comprising a configuration of a modular multilevel converter.

5. The apparatus according to claim 1 wherein the unit cell includes a bidirectional chopper circuit.

6. The apparatus according to claim 1 wherein the unit cell includes a full bridge circuit.

7. The apparatus according to claim 1 wherein the apparatus is connected with a three-phase AC power system.

8. The apparatus according to claim 3 further comprising a configuration of a modular multilevel converter.

9. The apparatus according to claim 3 wherein the unit cell includes a bidirectional chopper circuit.

10. The apparatus according to claim 3 wherein the unit cell includes a full bridge circuit.

11. The apparatus according to claim 3 wherein the apparatus is connected with a three-phase AC power system.

12. A power converting method utilizing a plurality of unit cells, each of which includes terminals, a capacitor and semiconductor switching elements connected in series, the capacitor and the semiconductor switching elements being connected in parallel, and a voltage at the capacitor being output at the terminals by operation of the semiconductor switching elements, wherein the terminals of adjacent ones of the unit cells are connected so that the plurality of unit cells are connected together in cascade, the cascade connection of the plurality of unit cells configure an arm of a power converter, said method comprising:

outputting a variable electric power from a variable voltage source;

wherein at a time of the initial charging operation, a capacitor of a selected unit cell is charged to a certain voltage to be available for a succeeding ordinary operation, wherein in the initial charging operation which occurs prior to starting of the ordinary operation, the capacitor of at least a selected one of the unit cells of the arm is charged at the terminals of that unit cell to the certain voltage with the output of the variable voltage source applied to the arm via non-selected unit cells of the arm, and the capacitors of the non-selected unit cells are not charged due to shunting of the terminals of the non-selected unit cells by turning off or on of the semiconductor switching elements thereof, wherein a time period of charging the capacitor of an individual unit cell in the initial charging operation is longer than a time period of turning on/off of the semiconductor switching elements of the unit cell in the ordinary operation, and in an ordinary operation of the power converter, the capacitor in each unit cell of the arm is charged from a predetermined portion of the arm via the adjacent unit cells, and an output of the power converter is a combined voltage of the output voltages of the unit cells of the arm.

13. The method according to claim 12, wherein the variable voltage source comprises a variable DC voltage source.

14. The method according to claim 12 wherein the unit cell includes a bidirectional chopper circuit.

15. The method according to claim 12 wherein the unit cell includes a full bridge circuit.

16. The method according to claim 12 wherein the unit cells are connected with a three-phase AC power system.

17. The apparatus according to claim 1, wherein the output voltage of the variable voltage source is controlled to be higher than a voltage of the capacitor of the unit cell in the initial charging operation, and is lower than a multiple of the initial charging voltage of a selected unit cell represented by the number of unit cells in the arm.

* * * * *